United States Patent [19]

Stevenson

[11] 4,333,254
[45] Jun. 8, 1982

[54] MULTIPURPOSE DENTAL X-RAY FILM MOUNT ARRANGEMENT

[75] Inventor: Charles F. Stevenson, Elgin, Ill.

[73] Assignee: Rinn Corporation, Elgin, Ill.

[21] Appl. No.: 251,477

[22] Filed: Apr. 6, 1981

[51] Int. Cl.³ .............................................. G09F 1/10
[52] U.S. Cl. .................................. 40/158 B; 40/2 R; 40/159
[58] Field of Search ............. 40/158 R, 158 A, 158 B, 40/159, 2 R, 156

[56] References Cited

U.S. PATENT DOCUMENTS

| | | | |
|---|---|---|---|
| 1,317,946 | 10/1919 | Snively | 40/159 |
| 1,387,488 | 8/1921 | Helmer | 40/159 |
| 1,878,113 | 11/1932 | Cressler | 40/159 |
| 2,804,202 | 8/1957 | Davis | 40/158 R |
| 2,914,166 | 11/1959 | Bihler | 40/2 R |
| 3,226,862 | 1/1966 | Gabruk | 40/2 R |
| 3,466,780 | 9/1969 | Reid | 40/158 R |
| 3,564,745 | 2/1971 | Johnson et al. | 40/158 B |
| 3,917,276 | 11/1975 | Green Barg | 40/2 R |
| 4,204,706 | 5/1980 | Blum et al. | 40/2 R |

FOREIGN PATENT DOCUMENTS 678670  7/1939  Fed. Rep. of Germany .... 40/158 B

OTHER PUBLICATIONS

"RINN", Catalog, 1979, pp. 1-7.

Primary Examiner—Gene Mancene
Assistant Examiner—John J. Wilson
Attorney, Agent, or Firm—McWilliams, Mann & Zummer

[57] ABSTRACT

A multipurpose dental X-ray film mount assembly that replaces a plurality of different and separate single purpose mounts, said assembly comprising two quadriaterally shaped sheets of a suitable semi-rigid plastic material of film thickness dimensions, with the sheets being plastic welded together by a continuous weld lying along the longitudinal center line of the assembly and a plurality of continuous weld lines that extend transversely of the assembly between its side edges and that are spaced apart to subdivide the assembly into a plurality of equally sized subdivisions of two sections each, one such section on either side of the longitudinally extending weld line. The sheets are also bonded together to define a dental X-ray film receiving closed bottom pocket at each assembly section that opens at the side edge of same. The continuous weld lines are extenuated to be frangible so that the assembly as a whole may be used to mount a predetermined number of dental X-ray radiographs of a patient's teeth, for instance eight films, or the assembly may be modified by tear off removal of one or more sections of the same along the appropriate continuous weld line for mounting dental radiographs either singly or in any of the familiar mount combinations now generally used by the practitioner, up to, for instance, eight radiographs in number.

9 Claims, 15 Drawing Figures

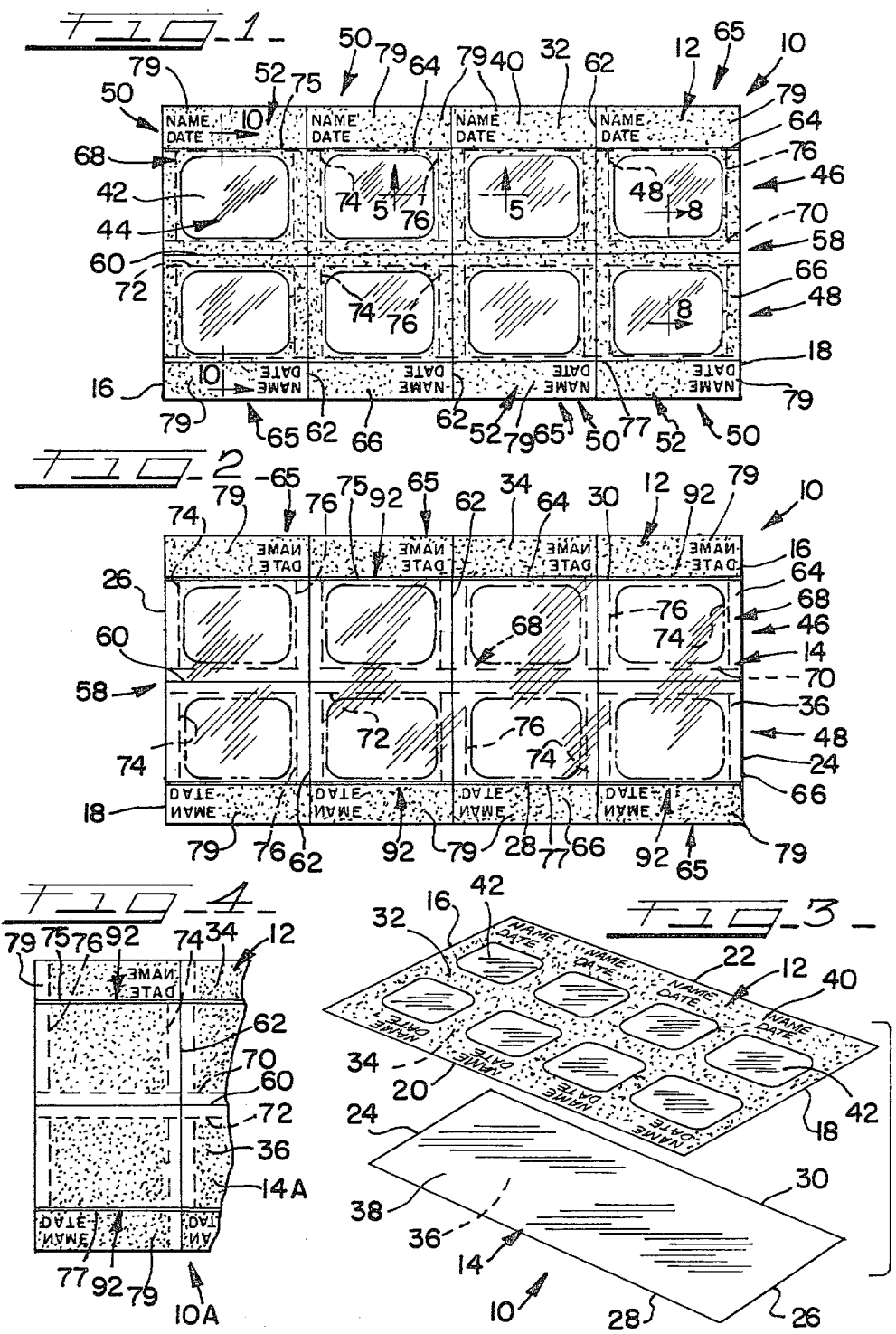

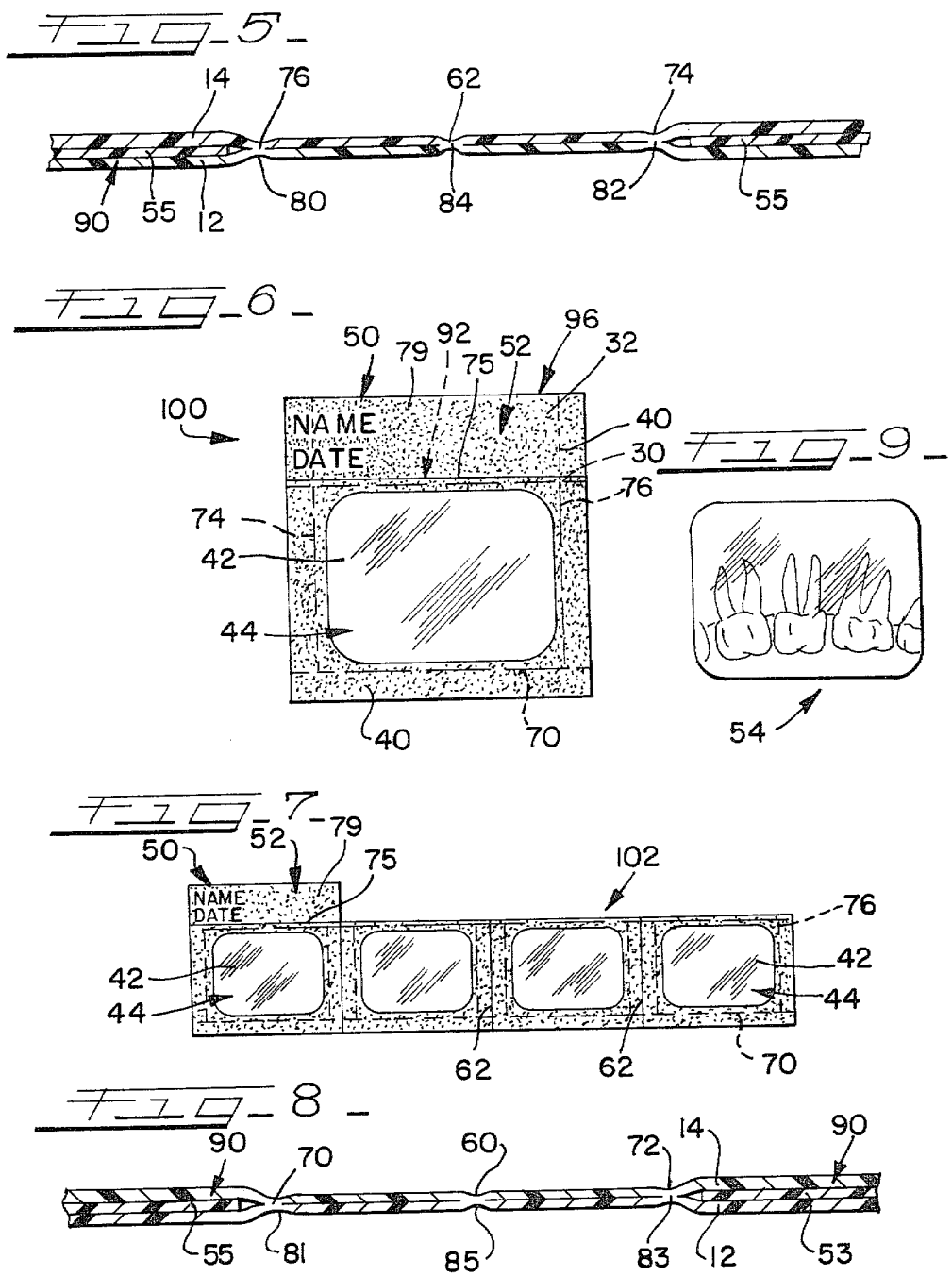

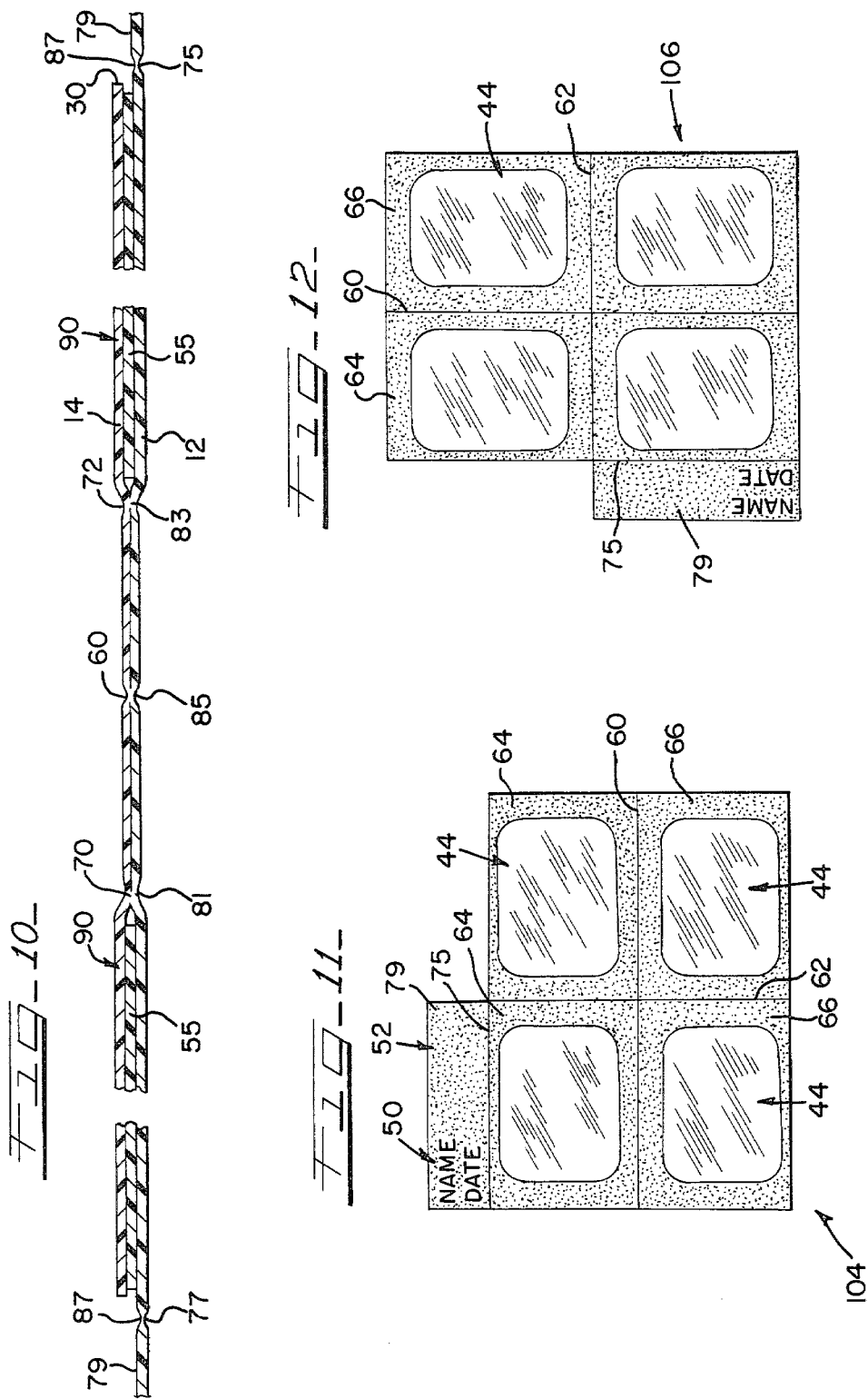

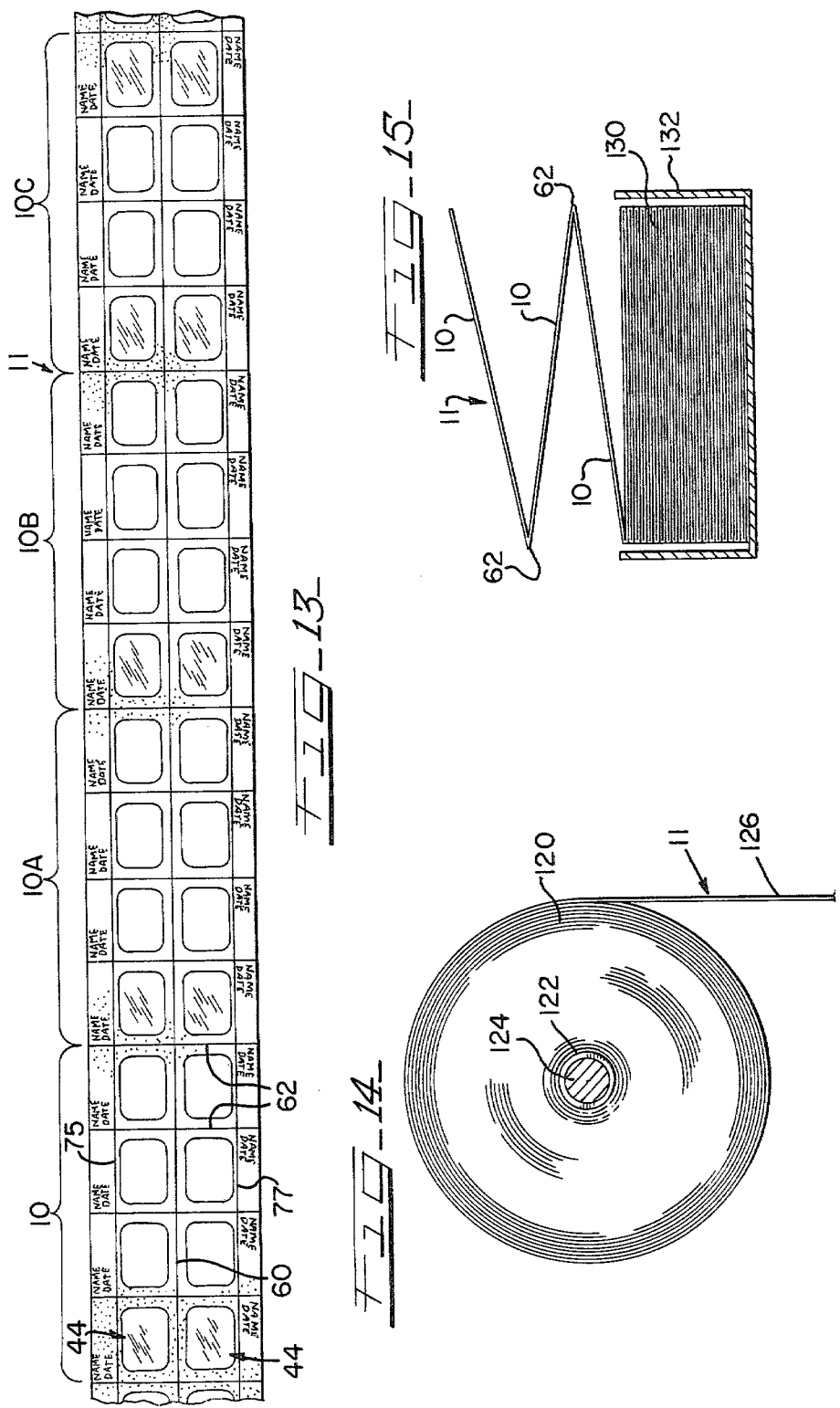

MULTIPURPOSE DENTAL X-RAY FILM MOUNT ARRANGEMENT

This invention relates to a dental film mount device, and more particularly, to a multipurpose dental film mount assembly for providing multiple ways of mounting dental radiographs at the option of the user, depending on the oral site of the radiograph.

Conventional film mounts generally comprise sheets of thin cardboard or paperboard integrated together by a suitable adhesive, and provided with aligned openings that, when the sheets are assembled, provide one or more mounting sites in the form of apertures or windows, open on both sides of the mount, for receiving the radiographs, with the sheets being cemented together about the film mount site. One of the openings of the assembled sheets is enlarged at one end of same at the front side of the mount so that the film comprising the radiograph may be inserted endwise into the resulting open centered pocket that is provided by the pair of aligned openings in question, and centered therein so that the margin of the film is frictionally held on all four sides in its mounting aperture or window in question. This mounts the radiograph for storing, viewing, and duplicating of the radiograph image at the user's convenience. In this type of conventional mount, the film as mounted is exposed at both sides of the mount.

Conventional film mounts are available in various sizes and mounting site or aperture numbers and orientation, to meet the practitioner's needs and desires for a particular patient's dental radiographs taken for record, study and diagnostic purposes. Considering that, for American National Standards Institute No. 2 standard size film (32 by 41 millimeters), for instance, the possible interoral radiograph sites are left and right, maxillary and mandubular (upper and lower) incisor, lateral incisor, cuspid, bicuspid, and molar regions, the dentist's radiograph needs, and thus his mount needs, for a particular patient may extend only to a single radiograph for, for instance, the right maxillary incisor region, or the left mandubular cuspid region, so that only a single radiograph film mounting site mount is required; alternately, the dentist may need right and left, maxillary and mandubular, bicuspid and molar region radiographs for a particular patient, and the mount assembly for same that would provide a separate mounting site for each radiograph involved, with the mounting sites oriented so that the respective radiographs involved may be applied to the mount in accordance with the respective right and left, and upper and lower site positions in the patient's mouth that the respective radiographs present.

Heretofore it has been the practice to provide for the dentist's film mount needs by making the mounts available in single purpose form in various standardized sizes that provide one to eight or more mounting apertures, with variations available to accommodate both horizontal and vertical radiographs. The result is that the mount manufacturer has to have on hand a relative large mount inventory that includes a suitable inventory for each of the various sizes, number, and orientation of the radiograph mounting apertures involved, and the dentist practitioner has to similarly maintain his mount supplies in the various sizes, number, and orientation of the radiograph mounting apertures involved, that he commonly uses in his practice. Each mount has a single purpose use in terms of the size, number, and orientation of the radiographs to be mounted in same, and the individual mounts are not readily adaptable to other dental radiograph film mount uses in terms of the radiograph oral site and image orientation selected by the practitioner.

A principal object of the present invention is to provide a multipurpose film mount assembly defining, for each such device, the same number of radiograph mounting sites with the same position orientation for each such device, and arranging the assembly into separate film pocket mounting units or sections that permit the practitioner to use the assembly as a whole, or separate one or more of such mounting units or sections from the assembly to use such separated units or sections as single or multiple film mounting mounts, with the film orientation desired, or permit similar use of the remaining mounting units of the original assembly, or both the latter.

Another principal object of the invention is to provide in a multiple purpose film mount assembly individual film mount units or sections that define planar rectilinear pockets in which the film is received that protects the film from both sides of same.

Another principal object of the invention is to provide a multipurpose film mount assembly defined by two sheets of a suitable semi-rigid plastic material that are welded together to define both individual film mounting sections or units that are frangibly connected for tear away removal from the assembly, and as to the individual sections or units, the sheets are welded together to define closed end and sidewall, film receiving and viewing, pockets or receptacles.

Still another important object of the invention is to provide a multiple purpose dental film holder or mount assembly of which the individual film mounting pockets or receptacles provide for full viewing of the film with full protection for both sides of the film against the adverse affects of the practitioner or his assistant directly handling the film for viewing or duplicating purposes, such as scratching, fingerprint clouding, and the like, and which can be made available to the practitioner in elongate strip form comprising a plurality of the basic assemblies involved integrally joined in end to end relation for roll strip type or folded Z configuration strip bulk supply arrangement.

Yet another important object of the invention is to provide a multiple purpose dental film holder assembly that is only about one-third the thickness of conventional dental film mounts, while mounting the film for consistently good duplication purposes without removing the film from its mounting pocket.

In accordance with the invention, a multipurpose dental X-ray film mount assembly is provided that replaces, for the embodiment illustrated, ten different and separate single purpose mounts each providing alternate, single purpose, film mounting capability in terms of number of radiographs and orientation of same. The new mount assembly as a basic unit comprises two quadrilaterally shaped sheets of a suitable plastic material of film thickness dimensions of which one is the front sheet and the other is the back sheet.

The front sheet of the assembly is transparent, and the back sheet may either be transparent or frosted. The said sheets are of the same length and the back sheet is narrower than the front sheet, with the front and back sheets being plastic welded together by a continuous weld line grid which comprises a single continuous weld line along the longitudinal center line of the assembly, and a plurality of continuous weld lines that extend transversely of the assembly unit between its side edges and that are spaced apart to subdivide the assembly unit into a plurality of equally sized subdivisions of two contiguous sections each, one on either side of the said longitudinally extending weld line. The assembly sheets are also plastic welded together by a grid of dashed weld lines comprising a pair of dashed base weld lines on either side of and equally spaced from the said continuous longitudinally extending weld line, and for each said assembly section, a pair of side dashed weld lines that extend transversely of the assembly between the side edges of the back sheet and the section portion of the indicated base dashed line weld line thereof, to define a dental X-ray radiograph receiving, closed bottom and side, pocket at each assembly section, which pockets open at the respective side edges of the assembly. The pockets are closed at the front and rear sides of the assembly by the respective sheets themselves, with the front side of the front sheet being imprinted with a writing implement markable with opaque ink that delineates for each pocket an ink free area proportioned to approximate the size of the dental radiograph to be received in the respective pockets and centered with respect to the respective pockets, for forming a transparent viewing window for each such pocket. The back sheet is either transparent or frosted for radiograph viewing and duplication purposes.

The continuous weld lines of the assembly are extenuated, or thinned down, to be frangible so that the assembly unit as a whole may be used to mount the number of dental radiographs corresponding to the number of mounting pockets defined by the assembly unit, or the assembly unit may be modified by tear-off removal of one or more of its said sections along the appropriate continuous, tear away forming weld lines involved for mounting radiographs either singly or in any of the familiar combinations now generally used by the practitioner, up to the number of mounting pockets provided by the assembly, which is eight in the illustrated embodiment. The assembly front sheets also includes a pair of extenuated or thinned down severance lines along either side edge of the back and disposed exteriorly or outwardly of same, but closely adjacent such back sheet side edges, to define for each of the assembly unit sections, adjacent the opening of the respective pockets, a tear off tab segment that is provided for manual marking patient identification purposes, with one of these being retained for a selected assembly unit or subdivision thereof, regardless of the number of radiographs to be mounted in the mount formed from the assembly unit for this purpose.

Still other objects uses and advantages will be obvious or become apparent from the following detailed description and the accompanying drawing figures, in which like parts are indicated by corresponding reference numerals throughout the several views.

In the drawings:

FIG. 1 is a top plan view showing the preferred embodiment of the invention as viewed from the front side of same, with the ink imprinting of the assembly front sheet that defines the viewing windows of the individual pockets being indicated by stippling rather than solid inking so that the illustration of the weld lines of the assembly will be facilitated;

FIG. 2 is a back or bottom plan view of the assembly shown in FIG. 1, in which embodiment the back sheet is transparent;

FIG. 3 is a top exploded perspective view of the assembly shown in FIGS. 1 and 2, with the weld lines omitted;

FIG. 4 is a view similar to that of FIG. 2 showing one end of the assembly, illustrating an embodiment in which the back sheet is frosted rather than being transparent;

FIG. 5 is a fragmental cross-sectional view taken substantially along line 5—5 of FIG. 1, but on an enlarged scale, illustrating the nature of the dashed and continuous weld lines employed in connection with the assembly to secure the assembly sheets together;

FIG. 6 is a front plan view showing a single mount section of the assembly ready for use as a mount for a single dental X-ray radiograph;

FIG. 7 is a view similar to that of FIGS. 1 and 6, but illustrating one-half of the assembly of FIG. 1 as arranged for acceptance of four dental X-ray radiographs;

FIG. 8 is a view similar to that of FIG. 5, but taken substantially along line 8—8 of FIG. 1;

FIG. 9 is a front plan view illustrating diagrammatically a typical radiograph for application to the mount assemblies illustrated;

FIG. 10 is a view similar to that of FIG. 8, but being taken substantially along line 10—10 of FIG. 1, with the center portion that would be the same as FIG. 8 being broken away;

FIGS. 11 and 12 are views similar to those of FIGS. 6 and 7, but showing another optional use of the invention basic assembly unit;

FIG. 13 diagrammatically illustrates the basic strip configuration in which the holder arrangement of this invention may be furnished in bulk quantities; and FIGS. 14 and 15 illustrate two ways in which the stripping of this invention may be furnished in this form.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

Reference numeral 10 of FIGS. 1 and 2 generally indicates a preferred form of radiograph mount assembly unit arranged in accordance with the invention, the details of which are shown more specifically in FIGS. 1-10. Assembly units 10 are preferably integrally united in end to end relation, as illustrated diagrammatically in FIG. 13 for identical units 10, 10A, 10B, 10C, etc., for arranging the invention to be supplied in bulk stripping form 11 that may be packaged for use by the practitioner in one of the manners diagrammatically illustrated in FIGS. 14 and 15.

The basic assembly unit 10, as such, comprises a top or front sheet 12 and a bottom or back sheet 14 formed from a suitable semi-rigid polymeric plastic sheeting material of film dimensions, such as the polyester film product sold under the trademark MYLAR by E. I. Du Pont De Nemours & Co. Inc., or polyethylene, or the like, of which both sheets 12 and 14 are of quadrilateral configuration, with the sheets 12 and 14 having the same length, but with the sheet 12 being of greater width than the sheet 14, as is best indicated by FIG. 2, in which the back side of the assembly 10 is illustrated.

As indicated in FIG. 3 for a unit 10, the front sheet 12 thus defines end edges 16 and 18, and side edges 20 and 22. Sheet 14 defines end edges 24 and 26, and side edges 28 and 30. As to the sheet 12, end edges 16 and 18 extend transversely thereof, while its side edges 20 and 22 extend longitudinally thereof. Similarly, as to sheet 14, the end edges 24 and 26 extend transversely thereof, while its side edges 28 and 30 extend longitudinally of same.

In the embodiment of FIGS. 1, 2 and 3, the sheets 12 and 14 are transparent; in a preferred embodiment, sheet 12 is 0.005 inch in thickness while sheet 12 is 0.007 inch in thickness.

Sheet 12 defines outwardly or forwardly facing side 32 and rearwardly or backwardly facing side 34. Sheet 14 defines outwardly or backwardly facing side 36 and inwardly or forwardly facing side 38.

In accordance with the invention, prior to assembling sheets 12 and 14, the front or forwardly facing side 32 of sheet 12 is imprinted with a suitable opaque ink to define a masking coating 40 that delineates across the surface or side 32 of the front sheet 12 a plurality of transparent areas 42 that are free of the ink, and form viewing windows 44 that are in two rows 46 and 48 across the side 32 of sheet 12 in equally spaced relation transversely and longitudinally of the sheet 12.

The coating 40 may be formed by any suitable ink for this purpose that will preclude the passage therethrough of any substantial amount of light, ink of the type used for offset printing being an example. The ink forming coating 40 also should be of the type that is visibly markable with a suitable writing implement such as a pen or pencil, for purposes about to be made clear. Ink of the type indicated that is grey, black, or dark green in color is suitable for this purpose, and is available from Roberts & Porter Incorporated of Elk Grove Village, Ill., this type of ink being commonly applied to bags formed from polyethylene, polyester, and the like.

Coating 40 also preferably delineates adjacent each viewing window 44 the words "NAME" and "DATE" for radiograph identification purposes, where indicated at 50, with a blank space left on the adjacent portion of coating 40 where indicated at 52 for hand written application of a patient's name and date of taking the radiograph that is to be viewed through a particular window 44. The "NAME" and "DATE" indicia may be formed by black ink applied to the coating 40 at the locations indicated in FIG. 1, or alternately the coating 40 is applied by suitable means to delineate the indicia indicated by non-inked areas, such as by using stenceling or silk screening techniques.

Parenthetically it is again pointed out that the coating 40 is preferably opaque, as indicated, but to facilitate drawing illustration the coating 40 is shown by the stippeling of the surface 32 that appears in the drawings.

Further in accordance with the invention, the sheets 12 and 14 are bonded together by employing suitable heat sealing or dielectric welding techniques, whereby the sheets are integrally connected together by two basic types of weld bond grids that have purposes in addition to making sheets 12 and 14 integral along weld lines.

The sheets 12 and 14 for purposes of bonding them together are placed in superimposed relation with the respective end edges 24 and 26 of sheet 14 aligned with corresponding end edges 16 and 18 of sheet 12, and with the sheet 14 centered with respect to the sheet 12 so that the side edges 20 and 22 of sheet 12 project beyond the corresponding side edges 28 and 30 of sheet 14 the same amount.

It is assumed for purposes of disclosure that windows 44 of sheet 12 that are defined by the coating 40 be proportioned to be substantially coextensive with the size of No. 2 standard dental X-ray film specified by the American National Sandards Institute, which is 32 by 41 millimeters, with the windows having rounded corners comparable to the film, with a typical radiograph film of this size being diagrammatically illustrated in FIG. 9, and indicated by reference numeral 54. However, this is for illustrative purposes only as the component parts of assembly 10 may be arranged or adapted to be appropriately sized for use with any film size.

Sheet 14 is proportioned transversely of same to overlap the windows 44 approximately the amount indicated in FIGS. 1 and 2, thereby leaving at the back or rear side 34 of the sheet 12 portions that project beyond the edges 28 and 30 of sheet 14 uncovered or exposed.

With the sheets 12 and 14 thus applied together to a suitable fixture or the like, the weld line grids contemplated by the invention are formed to integrally connect or bond sheets 12 and 14 together to form assembly 10. In this connection, single units 10 as such may be provided with the specifics indicated in FIGS. 1-10, but preferably sheets 12 and 14 are elongate strips welded together in the manner indicated for unit 10 to form the elongate stripping 11 that may include several hundred of the units 10 integrally connected together in end to end arrangement in the manner suggested by FIG. 13.

Two basic types of weld line grids or sets are employed to weld sheets 12 and 14 together. The first type 58 comprises continuous rectilinear weld line 60 that extends coincident and coextensive with the longitudinal center line of the placed together sheets 12 and 14 and extending between the respective end edges of same, that is between end edges 16 and 24 of the respective sheets 12 and 14 and end edges 18 and 26 of the same sheets, respectively, of a unit 10, which is accompanied by a plurality of continuous rectilinear weld lines 62 extending transversely of the sheets 12 and 14 (of a unit 10), and in particular, transversely of the respective side edges 20 and 22 of sheet 12 and 28 and 30 of sheet 14. Weld lines 62 are equally spaced apart longitudinally of the assembly units 10.

The weld lines 60 and 62 forming grid 58 are extenuated or thinned down so that said assembly units 10 are frangibly tearable along the respective weld lines 60 and 62.

It will be observed that the weld lines 60 and 62 delineate or subdivide such assembly unit 10 into pairs 65 of quadrilaterally shaped sections 64 and 66 that extend transversely of unit 10, and that are of equal dimensions longitudinally and transversely of the assembly, of which one section 64 of each pair 65 of sections 64 and 66 is on one side of the longitudinally extending weld line 60 and the other section 66 of such pair 65 is on the other side of the weld line 60.

The sheets 12 and 14 are also bonded together by a grid or set 68 of rectilinear dashed weld lines comprising for each unit 10 a pair of dashed base weld lines 70 and 72 disposed one on either side of weld line 60 and equally spaced therefrom, and being disposed in parallelism therewith and also extending between the side edges 16, 18 and 24, 26 of the respective sheets 12 and 14. The dashed weld lines 70 and 72 thus traverse the respective sets of sections 64 and 66. Further, the grid 68 includes spaced apart parallel transverse dashed weld lines 74 and 76 that extend longitudinally of the respective sections 64 and 66. At the sections 64, the dashed weld lines 74 and 76 extend from dashed weld line 70 to the side edge 30 of the sheet 14, while in the case of the section 66, the dashed lines 74 and 76 extend from the base dashed weld line 72 to the side edge 28 of the sheet 14.

As to the respective pairs 65 of sections 64 and 66, the dashed weld lines 74 and 76 of the respective sections 64 and 66 thereof are aligned transversely of the individual units 10, as indicated in FIGS. 1 and 2.

It will further be observed that the dashed weld lines 74 and 76 of each section are spaced apart longitudinally of the units 10 somewhat in excess of the length of the respective windows 44, and that the respective dashed weld lines 72 where they extend through the respective sections 64 and 66 are spaced somewhat from the margins of the windows 44 that are adjacent the continuous weld line 60.

FIG. 5 diagrammatically illustrate the basic nature of the respective weld lines involved for a set of adjacent weld lines 76, 62, and 74. At the weld lines 76 and 74, the sheets 12 and 14 are bonded or welded together to be integral as at 80 and 82, respectively, with little or preferably no thinning of the sheets 12 and 14 along the edge lines 74 and 76 since it is intended that the assembly 10 not be frangible or tearable along the weld lines 74 and 76, which in any event between the individual dashes of these lines sheets 12 and 14 are not bonded together, as is the case with dashed bond lines 70 and 72.

However, in the case of the bond lines 62, the sheets 12 and 14 in being made integral as at 84, are thinned down to, for instance, one-third or so of the combined thickness of the sheets 12 and 14, so as to be frangible or readily tearable on the weld lines 62, but with sufficient body left to enable assembly 10 to withstand handling if used for mount purposes as a whole.

FIG. 8 represents the configuration of the dashed bond lines 70 and 72, and the continuous bond line 60. At the weld lines 70 and 72, the sheets are bonded or welded together to be integral at 81 and 83, similarly to weld lines 74 and 76. At weld line 60, the sheets 12 and 14 in being made integral as at 85, are thinned down or extenuated in the same manner as weld lines 62, and for the same purpose.

The assembly also has formed in sheet 12 continuous severance lines 75 and 77 that parallel weld lines 60 and 62 and that are located closely adjacent but exteriorly of the side edges 28 and 30 of sheet 14. Severance lines 75 and 77 are of same nature as weld lines 60 and 62, but being formed only in sheet 12 they weld nothing together, though they are extenuated or thinned down as indicated at 87 in FIG. 10.

Severance lines 75 and 77 subdivide the respective sections 64 and 66 to define a removable, quadrilaterally shaped, tab segment 79 therefor that includes, for the respective sections 64 and 66, the "NAME" and "DATE" indicia 50 and the blank writing space 52 for the respective viewing windows 44. Segments 79, which are thus formed as an integral part of assembly units 10, are retained or removed as part of the procedure hereinafter described of adapting an assembly unit 10 to form a filling and mounting means for a particular radiograph or set of radiographs taken for a particular patient.

The thus completed assembly unit 10 defines in the respective sections 64 and 66 thereof a dental radiograph receiving pocket 90 that is open at 92, at the respective side edges 28 and 30 of sheet 14, and that is closed at the sides and bottom or lower end of the pocket 90 in each section 64 and 66 by the respective dashed bond lines 74, 76, and 70 in the case of the section 64, and the dashed bond lines 74, 76 and 72 in the case of section 66. In the showings of FIGS. 5, 8, and 10 radiographs 55 that are similar to radiograph 54 are shown inserted in the respective pockets 90. The severance lines 75 and 77 of sheet 12 are spaced outwardly of the respective pocket openings 92, and in a preferred embodiment, about one thirty-second of an inch from the respective edges 28 and 30 of sheet 14.

As described hereinbefore, the basic intraoral radiograph sites open to the dental practitioner in making radiographs are right and left, maxillary and mandibular (or upper and lower), incisor, lateral incisor, cuspid, bicuspid, and molar regions. In considering any particular patient's dental requirements, the practitioner may radiograph at any one of such sites or at selected of such sites, or at all of such sites. It has become conventional practice to mount the radiographs made for a particular patient at a particular time in one mount, with various mount assemblies being made available in the various sizes needed to mount the radiograph or radiographs taken by the practitioner at any particular time for study, diagnostic and record purposes. Thus, the practitioner may require a single window mount if only a single radiograph is taken at one of the indicated oral sites, or the practitioner might require mounts with eight or more windows in accordance with the number of such radiographs taken. Further, the radiographs may be horizontally or vertically oriented, depending on the radiographing site (the bicuspid and molar sites ordinarily call for horizontally oriented radiographs while the incisor, lateral incisor and cuspid sites ordinarily call for vertically oriented radiographs).

It is further common practice to select the film mount for the radiographs taken by the practitioner of a particular patient at a particular time that has viewing windows oriented in accordance with the location of the radiograph sites as they are located in the patient's mouth.

Consequently it will be seen that manufactures and distributors of mounts for dental X-ray radiographs conventionally have to keep inventories of the various sizes and shapes of film mounts in accordance with the window number and vertical or horizontal orientation that corresponds to the radiographs taken by the practitioner at any particular time of a given patient's mouth for diagnostic or record purposes or the like.

The mount assembly unit 10 of the present invention is arranged to provide one mount assembly that may be used as a whole in the event that eight horizontally disposed radiographs are to be applied to the mount, or that may be subdivided into single or multiple pocket units as needed to receive the less than eight radiographs to be applied to a particular mount assembly. While the mount unit 10 may be supplied for use as such, units 10 are preferably made in the form of stripping 11 (see FIG. 13) in which the units 10 are integrally end to end in the multiple unit form there illustrated for units 10, 10A, 10B, and 10C, in which case segments of stripping 11 may be separated therefrom to provide multiple pocket mount unit accommodating in excess of eight radiographs.

Referring to the unit 10 of FIGS. 1-10, for instance, if the practitioner requires only a single radiograph at one of the oral sites indicated, a section 64 or 66 may be torn of the assembly unit 10, by tearing same along the appropriate continuous weld lines 60 and 62 to provide the single window mount 100 shown in FIG. 6 with an associated tab segment 79 into which the resulting radiograph 55 may be inserted into pocket 90 from its open end 92 at the back side of the resulting segment 96 of sheet 12, with the appropriate patient and date data being applied to the indicated tab 79 at its area 52 using a pen or pencil.

The radiograph 55 applied to any one pocket 90 should be centered on its viewing window 44, which in turn is to be centered in the respective pockets 90.

Should the practitioner take radiographs in the mallixary bicuspid and molar regions on either side of the patient's mouth, the four resulting radiographs may be applied to a mount 102 illustrated in FIG. 7, which is formed from assembly unit 10 by dividing the assembly 10 in half along the frangible or tearable weld line 60, with either half of the assembly unit 10 being available to form mount 102 that receives the indicated radiographs. In addition, the unneeded tab setments 79 are removed from the resulting subassembly by separating same from sheet 12 along either severance line 75 or 77, depending on which half of the assembly unit 10 is used, to provide the result indicated in FIG. 7. While any one of the tab segments 79 involved could be the one retained for purposes of receiving the indicated patient and date data, it is recommended that for ease of practice either the right hand most or the left hand most (as illustrated) such tab 79 be retained.

Should the practitioner take maxillary and mandibular right and left bicuspid molar radiographs, a pair of sections 64 and 66 may be separated from an assembly unit 10 along the appropriate continuous weld line 62 to provide the mount 104 of FIG. 11 to mount the two resulting vertically oriented radiographs in side by side vertically disposed relation, by applying same to the respective pockets 90 in the orientation that the radiograph sites involved have in the patient's mouth. The tab segments 79 that are not needed are removed from the indicated sections 64 and 66 as suggested by FIG. 11.

Of course, the patient's name and date are applied in pencil or ink in the space 52 provided on the mount remaining tab 79.

Should the practitioner take maxillary and mandibular right and left lateral incisor radiographs, which are vertically disposed, the same mount 104 arrangement of FIG. 11 may be employed, but oriented for vertical radiographs to provide the mount 106 of FIG. 12, that receives the indicated lateral incisor radiographs oriented in accordance with their oral site in the patient's mouth.

In the modification shown in FIG. 4, the sheet 14A is the same as sheet 14 except that it is frosted on one surface of same, for instance its outwardly facing surface 36. Otherwise the assembly unit 10A of FIG. 4 is the same as the assembly units 10.

Further in accordance with the invention, the stripping 11, which may in either of the unit forms 10 or 10A, is provided, having the weld grids, severance lines and ink masking and window delineation indicated for the respective assembly units 10 and 10A, in elongate lengths having a multiple or such units 10 or 10A, such as in lengths of such unit 10 or 10A integrally connected together in end to end relation, for convenient packaging for sales and distribution, and subsequent convenient use by the practitioner. In the form of FIG. 14, stripping 11 is wound in the form of roll 120 on coreless tube 122 for application of tube 122 to suitable fixed horizontal spindle 124 for convenience dispensing, as needed by the practitioner, from leading end 126 thereof. In the preferred form of FIG. 15, stripping is prefolded Z manner throughout its length, along weld lies 62 that are at the opposite ends of the integrally connected eight pocket assembly units 10 (or 10A) and folded into stack 130 for application to suitable container 132 suitably formed from paperboard or the like, from which stripping end 134 may be drawn or pulled to remove the assembly unit sections 64 and/or 66 as needed. A suitable container cover (not shown) is provided for application to container 132 when the stripping 11 is not being used.

In any event, with the radiographs applied to the pocket or pockets of the mount subassembly or assembly selected, full area viewing of the individual films is provided for through the respective windows 44, with both sides of the film protected from scratching or finger print clouding. The coating 40 about the margin of the respective windows 40 provides a mask to reduce objectionable light about the margins of the film when the individual films as mounted in the respective mounts are viewed in a conventional illuminated viewing box. This enhances the diagnostic qualities of the radiograph being considered. Furthermore, radiographs as mounted in a mount formed from a unit 10 or 10A or one or more sections 64 and 66 of same provide considerably good photo made duplicates without removal from the mount pocket involved. The thickness of the assembly 10 and subassemblies of same is one-third the thickness of the mount product currently on the market with the result that duplicates of the radiograph as contained in it mount may be readily made without significant distortion due to the comparative thiness of the mount section involved containing a particular radiograph. The mount provides final storage for the radiograph or radiographs involved, and the individual mounts minimumize storage space requirements by reason of their thinness.

The flexibility provided by the assemblies 10 and 10A permits these assemblies to be offered in place of ten different mount configurations offerred by the applicant's assignee, reducing the applicant's assignee inventory requirements, as well as those of the practitioner, a corresponding amount.

It will therefore be seen that the invention provides a simple but effective mount assembly that can be inexpensively manufactured, which renders obsolete a number of standard mount configurations, which provides a mount assembly that may be used as a whole or subdivided as needed to meet particular radiograph mount and storing requirements, and that permits each radiograph mounted in accordance with the invention to be fully protected from both sides thereof while accommodating improved viewing, diagnostic, and duplicating qualities of same.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A dental X-ray film mount arrangement comprising:
    a front sheet and a back sheet, each of a polymeric material and each being of film thickness dimensions and disposed in face to face relation, said sheets being quadrilateral in configuration and having substantially the same length in coinciding relation, with said back sheet being narrower in width than said front sheet and being centered on said front sheet along the length thereof, whereby said sheets define at like opposed ends of same transversely extending end edges in substantially coinciding relation, and define at like opposed sides of same longitudinally extending side edges of which said side edges of said front sheet project beyond the side edges of said back sheet substantially equal amounts, said front sheet defining an outwardly facing side surface and an inwardly facing side surface facing said back sheet, said back sheet defining an outwardly facing side surface and an inwardly facing side surface facing said front sheet, said sheets being bonded together to form a mount assembly by:

a continuous rectilinear weld line coincident and coextensive with the longitudinal centerline of said sheets and extending between said end edges thereof, a plurality of continuous rectilinear weld lines extending transversely of said sheets between said longitudinally extending side edges of both said sheets and that are spaced apart longitudinally of said sheets to, together with the first mentioned weld line, delineate said assembly into pairs of quadrilateral sections of equal dimensions longitudinally and transversely of said sheets, of which one section of each pair is on one side of said first mentioned weld line and the other section of each pair is on the other side of said first mentioned weld line, said sheets being indented along said weld lines for making said assembly frangible therealong for effecting manual tear separation of one or more of said sections from said assembly, a pair of dashed base weld lines disposed one on either side of said first mentioned weld line, extending in parallel, equally spaced, relation thereto and therefrom between said end edges of said sheets, and for each of said sections, a pair of side dashed weld lines extending transversely of said sheets between said longitudinally extending side edges of said back sheet and the dashed weld line of said pair of base dashed weld lines that extends across the respective said sections, said sheets being free from securement to each other in the respective sections between said side dashed weld lines therefor for defining in each said section a planar dental X-ray film receiving pocket, said pockets being of substantially the same size, with the material from which the front sheet is formed being transparent, said front sheet outwardly facing side being imprinted with a writing implement markable opaque ink, with said imprinting delineating about each pocket an ink free area proportioned to approximate the size of dental X-ray film received in the respective pockets for forming a window for each such pocket, with said window of the respective pockets being approximately centered thereon.

2. The assembly of claim 1 wherein:
said back sheet is transparent.

3. The assembly of claim 1 wherein:
said back sheet is frosted.

4. The assembly of claim 1 wherein:
said sheets are bonded together to form multiple units of said assembly in end to end stripping form for tear off use of said sections in single or multiple form as needed to mount a selected set of radiographs.

5. The assembly of claim 1 wherein:
said front sheet has a thickness approximating 0.005 inch,
and said back sheet has a thickness approximating 0.007 inch.

6. A dental X-ray film mount arrangement comprising:

front and back sheets each of a polymeric material and each being of film thickness dimensions and disposed in face to face relation, said sheets being quadrilateral in configuration and having substantially the same length in coinciding relation, with said back sheet being narrower in width than said front sheet and being centered on said front sheet along the length thereof, whereby said sheets define at like opposed ends of same transversely extending end edges in substantially coinciding relation and define at like opposed sides of same longitudinally extending side edges of which said side edges of said front sheet project beyond the side edges of said back sheet substantially equal amounts, said front sheet defining an outwardly facing side surface and an inwardly facing side surface facing said back sheet, said back sheet defining an outwardly facing side surface and an inwardly facing side surface facing said front sheet, said sheets being bonded together to form a mount assembly by:

a continuous rectilinear, extenuated heat formed bonding indentation coincident and coextensive with the longitudinal centerline of said sheets and extending between said end edges thereof, a plurality of similar continuous extenuated heat formed bonding indentations extending transversely of said sheets between said longitudinally extending side edges of both said sheets and that are spaced apart longitudinally of said sheets to, together with the first mentioned indentation delineate said sheets into pairs of quadrilateral sections of equal dimensions longitudinally and transversely of said sheets of which one section of each pair is on one side of said first mentioned indentation and the other section of each pair is on the other side of said first mentioned weld line, said assembly being frangible along said indentation for effecting manual tear separation of selected of said sections from said assembly, a pair of dashed base weld lines disposed one on either side of said first mentioned indentation, extending in parallel, equally spaced, relation thereto and therefrom between said end edges of said sheets, and for each of said sections, a pair of side dashed weld lines extending transversely of said sheets between said longitudinally extending side edges of said back sheet and the dashed weld line of said pair of base dashed weld lines that extends across the respective said sections, said sheets being free from securement to each other in the respective sections between said side dashed weld lines thereof for defining in each said section a planar dental X-ray film receiving pocket, said pockets being of substantially the same size, with the material from which said front sheet is formed being transparent, said front sheet outwardly facing side being imprinted in a writing hand marking implement opaque ink, with said imprinting delineating about each pocket an ink free area proportioned to approximate the size of dental X-ray film received in the respective pockets for forming a film viewing window for each pocket, with said window of the respective pockets being approximately centered thereon, said front sheet defining adjacent each side edge of said back sheet a continuous extenuated heat formed severance line that parallels said longitudinal centerline of said sheets to provide adjacent each said pocket a tear away tab portion adapted to receive patient name and radiograph data indicia by employing a hand marking implement.

7. The dental film mount arrangement set forth in claim 6 wherein:

said sheets are bonded together to form multiple units of said assembly in end to end stripping form for tear off use of said sections in single or multiple form as needed to mount a radiograph set consisting of one or more radiographs of predetermined oral sites.

8. The dental film mount arrangement set forth in claim 7 wherein:

said stripping is in roll form.

9. The dental film mount arrangement set forth in claim 7 wherein:

said stripping is prefolded into a stack of Z folded assembly units each having a predetermined number of said sections.

* * * * *